United States Patent [19]

Schwartz

[11] 4,350,614

[45] Sep. 21, 1982

[54] CATALYTIC CRACKING CATALYST

[75] Inventor: Albert B. Schwartz, Philadelphia, Pa.

[73] Assignee: Mobil Oil Corporation, New York, N.Y.

[21] Appl. No.: 191,092

[22] Filed: Sep. 26, 1980

Related U.S. Application Data

[60] Continuation of Ser. No. 59,805, Jul. 23, 1979, abandoned, and a continuation of Ser. No. 897,077, Apr. 17, 1978, Pat. No. 4,265,787, which is a division of Ser. No. 869,079, Jan. 13, 1978, Pat. No. 4,174,272, which is a division of Ser. No. 659,308, Feb. 19, 1976, which is a continuation-in-part of Ser. No. 649,261, Jan. 15, 1976, Pat. No. 4,072,600, which is a continuation-in-part of Ser. No. 599,920, Jul. 28, 1975, which is a continuation-in-part of Ser. No. 440,890, Feb. 8, 1974, abandoned, and a continuation-in-part of Ser. No. 399,008, Sep. 20, 1973, abandoned.

[51] Int. Cl.³ .................. B01J 29/12; B01J 29/16
[52] U.S. Cl. .................. 252/455 Z; 208/120
[58] Field of Search .................. 252/455 Z; 208/120

[56] References Cited

U.S. PATENT DOCUMENTS

4,072,600  2/1978  Schwartz .................. 208/120
4,088,568  5/1978  Schwartz .................. 208/120

*Primary Examiner*—Carl F. Dees
*Attorney, Agent, or Firm*—Charles A. Huggett; Michael G. Gilman; Charles J. Speciale

[57] ABSTRACT

Non-hyrogenative endothermic catalytic cracking of hydrocarbon, particularly petroleum, fractions at relatively low pressures and high temperatures in a system where the endothermic heat required for cracking is supplied by catalyst as the heat transfer medium, which catalyst has been heated by burning coke deposited on the catalyst during cracking; and wherein a decomposable compound of platinum, palladium, ruthenium, iridium, osmium, rhodium or rhenium, is introduced into contact with the cracking catalyst during said process.

6 Claims, 3 Drawing Figures

Figure 3

CATALYTIC CRACKING CATALYST

CROSS-REFERENCE TO RELATED APPLICATIONS

This application is a continuation of copending application Ser. No. 59,805, filed July 23, 1979, now abandoned, which in turn is a division of application Ser. No. 869,079, filed Jan. 13, 1978 now U.S. Pat. No. 4,174,272, which in turn is a division of Application Ser. No. 659,308 filed Feb. 19, 1976, which in turn is a continuation-in-part of Application Ser. No. 649,261 filed Jan. 15, 1976 now U.S. Pat. No. 4,072,600, which in turn is a continuation-in-part of Application Ser. No. 440,890 filed Feb. 8, 1974 now abandonded which is in turn a continuation-in-part of Application Ser. No. 399,008 filed Sept. 20, 1973, now abandonded; and a continuation-in-part of Application Ser. No. 599,920 filed July 28, 1975. The contents of these applications as well as the content of any patents and/or applications referred to therein are hereby incorporated herein by reference. This application is also a continuation of Ser. No. 897,077, filed Apr. 17, 1978, now U.S. Pat. No. 4,265,787, issued May 5, 1981.

BACKGROUND OF THE INVENTION

This invention relates to catalytic cracking of hydrocarbons. It more particularly refers to improvements in the endothermic catalytic cracking of petroleum fractions and alternating exothermic catalyst regeneration.

Endothermic catalytic cracking of hydrocarbons, particularly petroleum fractions, to lower molecular weight desirable products is well known. This process is practiced industrially in a cycling mode wherein hydrocarbon feedstock is contacted with hot, active, solid particulate catalyst without added hydrogen at rather low pressures of up to about 50 psig and temperatures sufficient to support the desired cracking. As the hydrocarbon feed is cracked to lower molecular weight, more valuable and desirable products, "coke" is deposited on the catalyst particles. The coked catalyst is disengaged from the hydrocarbon products, which are then resolved and separated into appropriate components. The coked catalyst particles, now cooled from the endothermic cracking and disengaged from the hydrocarbon products, are then contacted with an oxygen containing gas whereupon coke is burned off the particles to regenerate their catalytic activity. During regeneration, the catalyst particles absorb the major portion of the heat generated by the combustion of coke, i.e. they are "reflexively" heated, with consequent increase of catalyst temperature. The heated, regenerated catalyst particles are then contacted with additional hydrocarbon feed and the cycle repeats itself.

A flue gas comprising carbon oxides is produced during regeneration. In conventional operation this flue gas contains substantial quantities of carbon monoxide. The carbon monoxide is either vented to the atmosphere with the rest of the flue gas or is in some way burned to carbon dioxide, in an incinerator or a CO boiler or the like.

It has recently become desirable to decrease the content of carbon monoxide in the regenerator flue gas for at least two reasons. In the first place, CO combustion is extremely exothermic and in view of the increasing cost of energy, burning CO in the regenerator increases the heat efficiency of the reflexive endothermic catalytic cracking system. In the second place, since carbon monoxide is an air pollutant, more and more stringent controls are being placed upon its venting into the environment. It is therefore clearly desirable to provide means for burning carbon monoxide within a reflexive hydrocarbon catalytic cracking system. This has been attempted in the past and is being attempted at present by means of increasing the temperature and air input to the regenerator so as to support thermal combustion of carbon monoxide in the regenerator. This technique has been difficult to commercialize and to operate successfully in a smooth, steady state manner.

In the past attempts have been made, in fact it has sometimes been commercial practice, to employ special catalysts for this process which contain a cracking component and a component for catalyzing the oxidation of carbon monoxide. The CO oxidation components used in the past have been metals of the transition element group and/or of the iron group. In particular, manganese, cobalt and especially chromium have been used for this purpose.

Two major variants for endothermically cracking hydrocarbons are fluid catalytic cracking (FCC) and moving bed catalytic cracking. In both of these processes as commercially practiced, the feed hydrocarbon and the catalyst are passed through a "reactor"; are disengaged; the catalyst is regenerated with cocurrent and/or countercurrent air; and the regenerated reflexively heated catalyst recontacted with more feed to start the cycle again. These two processes differ substantially in the size of the catalyst particles utilized in each and also in the engineering of materials contact and transfer which is at least partially a function of the catalyst size.

In fluid catalytic cracking (FCC), the catalyst is a fine powder of about 10 to 200 microns, preferably about 70 micron, size. This fine powder is generally propelled upwardly through a riser reaction zone suspended in and thoroughly mixed with hydrocarbon feed. The coked catalyst particles are separated from the cracked hydrocarbon products, and after purging are transferred into the regenerator where coke is burned to reactivate the catalyst. Regenerated catalyst generally flows downward from the regenerator to the base of the riser.

One typical example of industrially practiced moving bed hydrocarbon catalytic cracking is known as thermofor catalytic cracking (TCC). In this process the catalyst is in the shape of beads or pellets having an average particle size of about 1/64 to ¼ inch, preferably about ⅛ inch. Active, hot catalyst beads progress downwardly cocurrent with a hydrocarbon charge stock through a cracking reaction zone. In this zone hydrocarbon feed is endothermically cracked to lower molecular weight hydrocarbons while coke is deposited on the catalyst. At the lower end of the reaction zone the hydrocarbon products are separated from the coked catalyst, and recovered. The coked catalyst is then passed downwardly to a regeneration zone, into which air is fed such that part of the air passes upwardly countercurrent to the coked catalyst and part of the air passes downwardly cocurrent with partially regenerated catalyst. Two flue gases comprising carbon oxides are produced. Regenerated catalyst is disengaged from the flue gas and is then lifted, pneumatically or mechanically, back up to the top of the reaction zone.

The catalysts used in endothermic catalytic nonhydrogenative cracking are to be distinguished from catalysts used in exothermic catalytic hydrocracking. Operating conditions also to be distinguished. While the catalytic cracking processes to which this invention is directed operate at low pressures near atmospheric and in the absence of added hydrogen, hydrocracking is operated with added hydrogen at high pressures of up to about 1,000 to 3,000 psig. Further, non-hydrogenative catalytic cracking is a reflexive process with catalyst cycling between cracking and regeneration (coke burn off) over a very short period of time, seconds or minutes. In hydrocracking, on the other hand, the catalyst remains in cracking service for an extended period of time, months, between regeneration (coke burn off). Another important difference is in the product. Non-hydrogenative catalytic cracking produces a highly unsaturated product with substantial quantities of olefins and aromatics, and a high octane gasoline fraction. Hydrocracking, in contrast produces an essentially olefin-free product with a relatively low octane gasoline.

This invention is not directed to hydrocracking nor is it within the scope of this invention to use hydrocracking catalysts in the process hereof. Hydrocracking catalysts have an acidic cracking component, which may be a crystalline aluminosilicate zeolite, amorphous silica alumina, clays or the like, and a very strong hydrogenation/dehydrogenation component. Strong hydrogenation/dehydrogenation components are illustrated by metals such as molybdenum, chromium and vanadium, and group VIII metals such as cobalt, nickel and palladium. These are used in relatively large proportion, certainly large enough to support heavy hydrogenation of the charge stock under the conditions of hydrocracking. To the contrary, strong hydrogenation/dehydrogenation metals are neither required nor desired as components of non-hydrogenative catalytic cracking. In fact, it is usual for some metals, such as nickel and vanadium, to deposit out on the catalyst from the charge stock during non-hydrogenative cracking. These are considered to be catalyst poisons in this process and therefore to be avoided or at least minimized. Their detrimental effect in non-hydrogenative catalytic cracking is to increase the coke and light gas, including hydrogen, produced in the cracking reaction and therefore to reduce the yield of desired liquid products, particularly gasoline.

Figures 1, 2:
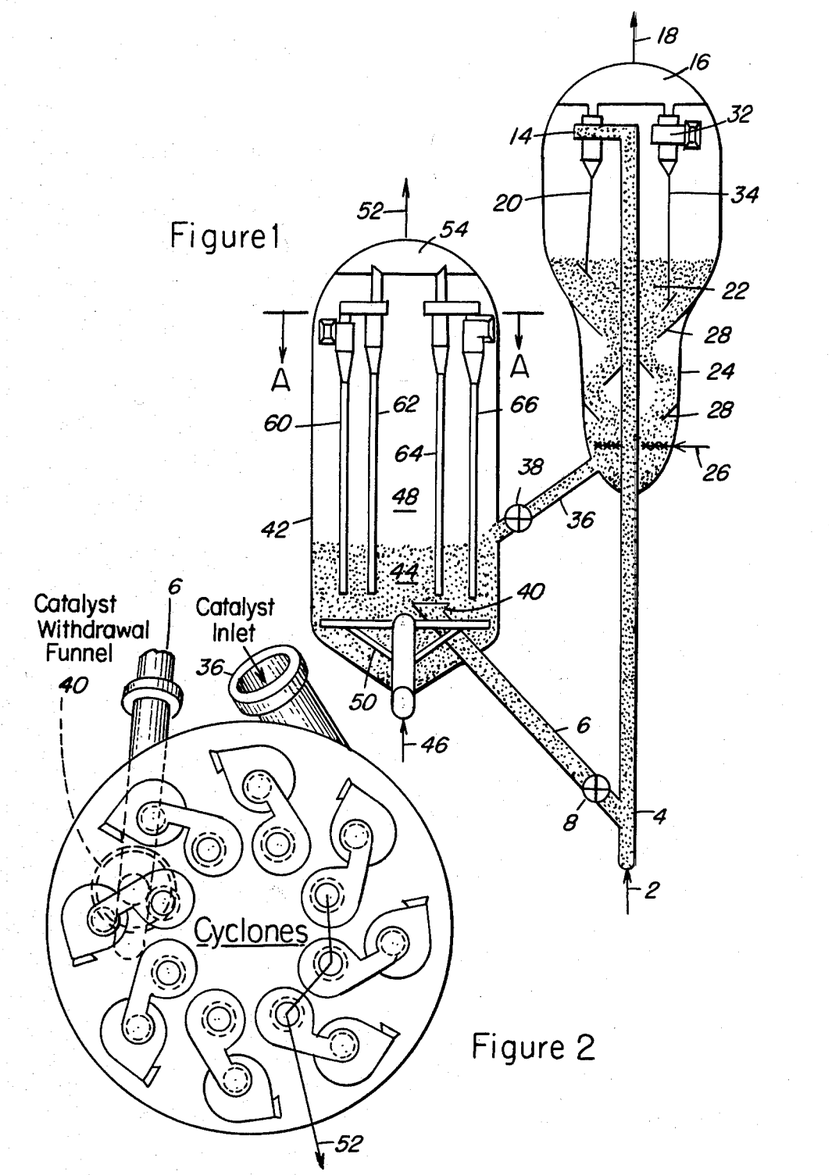
FIG. 1 exemplifies a fluid catalytic cracking apparatus
FIG. 2 shows the relative oxidation activity of promoter metals

FIG. 1 and the sectional element thereof shown in FIG. 2 are representative of a commercial fluid catalytic cracking unit. Referring now to FIG. 1, a hydrocarbon feed 2 such as a gas oil boiling from about 600° F. up to 1,000° F. is passed after preheating thereof to the bottom portion of riser 4 for admixture with hot regenerated catalyst introduced by standpipe 6 provided with flow control valve 8. A suspension of catalyst in hydrocarbon vapors at a temperature of at least about 950° F. but more usually at least 1,000° F. is thus formed in the lower portion of riser 4 for flow upwardly therethrough under hydrocarbon conversion conditions. The suspension initially formed in the riser may be retained during flow through the riser for a hydrocarbon residence time in the range of 1 to 10 seconds.

The hydrocarbon vapor-catalyst suspension formed in the riser reactor is passed upwardly through riser 4 under hydrocarbon conversion conditions of at least 900° F. and more usually at least 1,000° F. before discharge into one or more cyclonic separation zones about the riser discharge, represented by cyclone separator 14. There may be a plurality of such cyclone separator combinations comprising first and second cyclonic separation means attached to or spaced apart from the riser discharge for separating catalyst particles from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper portion of riser conversion zone 4. Catalyst bed 22 is maintained as a downwardly moving fluid bed of catalyst counter-current to rising gasiform material. The catalyst passes downwardly through a stripping zone 24 immediately therebelow and counter-current to rising stripping gas introduced to a lower portion thereof by conduit 26. Baffles 28 are provided in the stripping zone to improve the stripping operation.

The catalyst is maintained in stripping zone 24 for a period of time sufficient to effect a higher temperature desorption of feed deposited compounds which are then carried overhead by the stripping gas. The stripping gas with desorbed hydrocarbons pass through one or more cyclonic separating means 32 wherein entrained catalyst fines are separated and returned to the catalyst bed 22 by dipleg 34. The hydrocarbon conversion zone comprising rise 4 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gasiform materials comprising stripping gas hydrocarbon vapors and desorbed sulfur compounds are passed from the cyclonic separation means represented by separator 32 to a plenum chamber 16 for removal with hydrocarbon products of the cracking operation by conduit 18. Gasiform material comprising hydrocarbon vapors is passed by conduit 18 to a product fractionation step not shown. Hot stripped catalyst at an elevated temperature is withdrawn from a lower portion of the stripping zone by conduit 36 for transfer to a fluid bed of catalyst being regenerated in a catalyst regeneration zone. Flow control valve 38 is provided in transfer conduit 36.

This type of catalyst regeneration operation is referred to as a swirl type of catalyst regeneration due to the fact that the catalyst bed tends to rotate or circumferentially circulate about the vessel's vertical axis and this motion is promoted by the tangential spent catalyst inlet to the circulating catalyst bed. Thus, the tangentially introduced catalyst at an elevated temperature is further mixed with hot regenerated catalyst or catalyst undergoing regeneration at an elevated temperature and is caused to move in a circular or swirl pattern about the regenerator's vertical axis as it also moves generally downward to a catalyst withdrawal funnel 40 (sometimes called the "bathtub") adjacent the regeneration gas distributor grid. In this catalyst regeneration environment, it has been found that the regeneration gases comprising flue gas products of carbonaceous material combustion tend to move generally vertically upwardly through the generally horizontally moving circulating catalyst to cyclone separators positioned above the bed of catalyst in any given vertical segment. As shown by FIG. 2, the catalyst tangentially introduced to the regenerator by conduit 36 causes the catalyst to circulate in a clockwise direction in this specific embodiment. As the bed of catalyst continues its circular motion some catalyst particles move from an upper portion of the mass of catalyst particles suspended in regeneration gas downwardly therethrough to a catalyst withdrawal funnel 40 in a segment of the vessel adjacent to the catalyst inlet segment. In the regeneration zone 42 housing a mass of the circulating suspended catalyst particles 44 in upflowing oxygen containing regeneration gas introduced to the lower portion thereof by conduit distributor means 46, the density of the mass of suspended catalyst particles may be varied by the volume of regeneration gas used in any given segment or segments of the distributor grid. Generally speaking, the circulating suspended mass of catalyst particles 44 undergoing regeneration with oxygen containing gas to remove carbonaceous deposits by burning will be retained as a suspended mass of swirling catalyst particles varying in density in the direction of catalyst flow and a much less dense phase of suspended catalyst particles 48 will exist thereabove to an upper portion of the regeneration zone. Under carefully selected relatively low regeneration gas velocity conditions, a rather distinct line of demarcation may be made to exist between a dense fluid bed of suspended catalyst particles and a more dispersed suspended phase (dilute phase) of catalyst thereabove. However, as the regeneration gas velocity conditions are increased there is less of a demarcation line and the suspended catalyst passes through regions of catalyst particle density generally less than about 30 lbs. per cu. ft. A lower catalyst bed density of at least 20 lb/cu. ft. is preferred.

A segmented regeneration gas distributor grid 50 positioned in the lower cross-sectional area of the regeneration vessel 42 is provided as shown in FIG. 1 and is adapted to control the flow of regeneration gas passed to any given vertical segment of the catalyst bed thereabove. In this arrangement, it has been found that even with the generally horizontally circulating mass of catalyst, the flow of regeneration gas is generally vertically upwardly through the mass of catalyst particles so that regeneration gas introduced to the catalyst bed by any given grid segment or portion thereof may be controlled by grid openings made available and the air flow rate thereto. Thus, oxygen containing combustion gases after contact with catalyst in the regeneration zone are separated from entrained catalyst particles by the cyclonic means provided and vertically spaced thereabove. The cyclone combinations diagrammatically represented in FIG. 1 are intended to correspond to that represented in FIG. 2. Catalyst particles separated from the flue gases passing through the cyclones are turned to the mass of catalyst therebelow by the plurality of provided catalyst diplegs.

As mentioned above, regenerated catalyst withdrawn by funnel 40 is conveyed by standpipe 6 to the hydrocarbon conversion riser 4.

The regenerator system shown in FIGS. 1 and 2 is usually designed for producing a flue gas that contains a substantial concentration of carbon monoxide along with carbon dioxide. In fact, a typical $CO_2/CO$ ratio is about 1.2.

As noted above, there has recently been a marked increase in the desire to reduce carbon monoxide emissions from the regenerator of a reflexive non-hydrogenative catalytic cracking process. Prior proposed solutions, of increasing the temperature of the regenerator sufficient to thermally burn CO, or of incorporating chromium or iron with the cracking catalyst to support catalytic CO combustion, have not accomplished a sufficient reduction in CO emissions or, when this reduction has approached sufficiency, it has been at the expense of a great detriment to the operation and product distribution of the cracking reaction side of this process. In addition to the fact that increased production of coke on the cracking side throws this entire reflexive system into heat imbalance, the increased production of light gas unduly strains the capacity of the compressors and the entire gas plant, that is the series of separation operation in which the C4 gasiform part of the product is resolved into its component parts.

It is therefore an important object of this invention to provide a novel means of reducing carbon monoxide emissions from a reflexive, non-hydrogenative catalytic cracking process.

It is another object of this invention to provide a novel catalyst for such a process.

It is another object of this invention to provide an improved process for the fluid catalytic cracking of gas oils in the absence of added hydrogen:

Other and additional objects of this invention will become apparent from a consideration of this entire specification including the claims hereof.

Various references which have been uncovered may bear upon the subject matter of this application. The following list is not suggested to be exhaustive or all inclusive. It does, however, identify those presently known references which, in the opinion of counsel, seem to bear upon this subject matter:

U.S. Pat. No. 3,660,310 Kluksdahl;
U.S. Pat. No. 3,788,977 Dolbear;
U.S. Pat. No. 3,364,136 Chen et al.;
U.S. Pat. No. 2,436,927 Kassel
U.S. Pat. No. 3,226,339 Frilette et al.

DETAILED DESCRIPTION OF THE INVENTION

In accord with and fulfilling these objects, one aspect of this invention resides in a novel catalyst comprising an acidic cracking component and a minute quantity of one platinum group metal selected from platinum, palladium, iridium, osmium, rhodium, ruthenium and rhenium. For convenience, these metals including rhenium shall be hereinafter referred to as "a platinum group metal" even though it is known that rhenium is not so located in the Periodic Table of Elements as to usually qualify for this appellation. The platinum group metal may be initially provided in a reduced or oxidized form of any given valence. In use it will equilibrate to such form and chemical nature as is induced by the reflexive cracking and regeneration system.

The platinum group metal may be a component of all catalyst particles or only of some of the catalyst particles. In terms of its concentration in the entire system, it must be present in a large enough proportion to be able to effect the reaction of carbon monoxide with oxygen to carbon dioxide, provided the conditions in the regenerator are otherwise sufficient to support this combustion; e.g., sufficiently high temperature and sufficient air. Yet it must not be present in a proportion so large that it substantially adversely affects the operation of the cracking side of the process. This latter, upper limit on platinum group metal content is to some extent a reflection of the design capacity of the cracking system including auxiliaries and downstream product resolution facilities compared to actual operating throughput. The upper level of platinum group metal content must be less than that which would cause this design capacity to be exceeded.

Further, as a practical consideration each of the seven metals of the platinum group as defined herein has a different degree of effectiveness for their intended use in this system. Therefore, numerical upper and lower limits of metal proportions are blanketing numbers for the entire group. They are not necessarily applicable as a proper range for any given species within this genus. Thus, for example, an appropriate upper limit for the proportion of metal of the entire platinum group metal genus is about 100 parts per million based upon the finished catalyst formulation. While it is clear that this is a proper upper limit for the genus, it is also clear that this numerical value may be quite high for certain species of the genus, notably platinum and iridium in which case a preferred upper limit might better be set at about 10 parts per million on the same basis.

It is also clear that although a lower numerical limit can be applied to the proportion of "platinum group metal" used in this catalyst, this value must also be considered as applied to the genus and should be carefully reconsidered as to each individual species. Thus, a lower limit of about 0.1 part per million of platinum group metal is considered to be appropriate with respect to the use of some metals, such as platinum, but this value may be lower than the minimum suitable for the application of other metals such as rhenium for example.

In any case, however, the most appropriate measure of the amount of any particular platinum group metal is related exclusively to how it performs in reflexive, endothermic, non-hydrogenative catalytic cracking. There should be a sufficient quantity to support as much combustion of carbon monoxide as is desired considering the inherent limitations of any given operating system, such as temperature limitations based upon equipment metallurgy and/or coke producing propensities of a particular feed or feed slate.

In this regard it is important to note that in some instances it may be desirable to cause substantially all of the carbon burned in the regenerator to be oxidized all the way to carbon dioxide. In other instances, it may be desirable to cause only part of the carbon to be oxidized all the way to carbon dioxide and permit some substantial amount to be only partially oxidized to carbon monoxide. The use of the instant catalyst now permits the refiner to select the exact amount of heat to be generated in the regenerator as a function of efficient carbon monoxide burning. It permits him to increase the regenerator temperature by burning some of the carbon monoxide therein, (thereby reducing residual coke on regenerated catalyst and increasing the activity of regenerated catalyst) and burning the rest outside the regenerator, for example in a steam generating CO boiler.

As noted, the novel catalyst of this invention can be used by itself in a reflexive catalytic cracking operation or it can be used in admixture with otherwise conventional cracking catalyst. In either of these modes, the proportion of platinum group metal can be varied within the functional limits set forth above. It should be noted that it may be desirable to vary the proportion of platinum group metal with time on stream, that is it may be desirable to modify an existing operating reflexive cracking system which is utilizing a catalyst not employing a platinum group metal by providing initial makeup fresh catalyst containing relatively large proportions of platinum group metal, e.g. about 1 to 50 parts per million based upon total catalyst, and then to add further quantities of makeup fresh cracking catalyst containing decreasing proportions of platinum group metal until the accumulated active platinum metal content of the total catalyst inventory reaches the desired level, e.g., about 0.05 to 5 parts per million based upon the total catalyst inventory.

Since the amount of platinum group metal employed is so very small, it is extremely difficult to analyze the form of the metal on the catalyst in operation, particularly after it has been on stream for awhile and has gone through many cycles of cracking and regeneration.

The metal may be applied to the cracking catalyst after such has been preformed. It may be incorporated during manufacture of the cracking catalyst. It may be applied to a non-cracking substrate and this then incorporated with a cracking catalyst, perhaps with a binder.

The platinum group metal may be present with the cracking catalyst as the metal, oxide, sulfide, halide, sulfate, carbide, etc. The catalyst composition may have, as a component thereof, a substrate or binder such as silica, alumina, zirconia, magnesia, clay, mixtures thereof and/or amorphous or crystalline compounds thereof with each other or with other materials such as titania-zirconia. The cracking component may be an amorphous silica-alumina, an acid clay, an acid crystalline aluminosilicate zeolite particularly one of very low alkali, e.g. sodium, content and/or other known materials.

If the platinum group metal is incorporated with the cracking component outside the cracking/regeneration system, such may be by impregnation, ion exchange, vapor deposition or otherwise, by contacting a preformed cracking catalyst composition or one or more components thereof with a solution of a compound of the metal in an appropriate amount necessary to provide the desired minute concentration of metal needed for this invention. The platinum group metal may be incorporated during any step in the catalyst preparation as well as with the unfinished catalyst. Specific examples of suitable platinum group metal compounds include the metal halides, preferably chlorides, nitrates, ammine halides, oxides, sulfates, phosphates and other water-soluble inorganic salts; also as metal carboxylates of from 1 to 5 carbon atoms; or as alcoholates. Specific examples include palladium chloride, chloroplatinic acid, ruthenium penta-ammine chloride, osmium chloride perrhenic acid, dioxobis (ethylenediamine)rhenium(V) chloride, rhodium chloride and the like.

The platinum group metal may be incorporated with the cracking component when the latter is contained in the cracking/regeneration system. The metal may be added into the reflexive endothermic cracking/regeneration system as an emulsion, suspension or solution in the oil feed, for example. The metal, i.e. Pt, Pd, Ru, Ir, Os, Rh or Re may be in any one of a large number of metallic or non-metallic forms collectively described herein as "decomposable". Included as decomposable metal compounds, for example, are: suspensions of colloidal platinum; dispersions of platinum on an inorganic base such as alumina, such base having a particle size substantially smaller, i.e. less than about half, then the average particle size of the catalyst, such as colloidal alumina; suspensions of the aforesaid dispersions in a fluid carrier such as fuel oil, air or water; emulsions of aqueous solutions of platinum compounds; and vapors of the volatile metal compounds in a suitable carrier such as an inert gas. Thus, the term "decomposable" as used herein broadly encompasses all forms of the metal suitable for incorporation into and in association with the cracking component, whether or not the said cracking component is contained within the cracking/regeneration system. In general, the decomposable metal compound, on contact with the cracking component in the cracking/regeneration system, undergoes transformation such that an intimate, irreversible association is formed with the cracking component, i.e. the decomposable metal compound loses its identity and cannot readily be recovered as such by ordinary physical means of separation.

The decomposable metal compounds that may be introduced directly into the unit, i.e. the cracking/regeneration system, include those hereinabove mentioned, by way of example, alternatively, an oil-soluble or oil-dispersible compound of the metal may be added in suitable amount of a hydrocarbon feedstock, such as a gas oil charge stock, for incorporation in the catalyst as the charge is cracked. Such compounds include metal diketonates, carbonyls, metallocenes, olefin complexes of 2 to 20 carbons, acetylene complexes, alkyl or aryl phosphine complexes and carboxylates of 1 to 20 carbons. Specific examples of these are platinum acetylacetonate, tris (acetylacetonato) rhodium (III), triiodoiridium (III) tricarbonyl, $\pi$-cyclopentadienylrhenium (I) tricarbonyl, ruthenocene, $\pi$-cyclopentadienylosmium (I) dicarbonyl dimer, dichloro (ethylene) palladium (II) dimer, ($\pi$-cyclopentadienyl (ethylene) rhodium (I), diphenylacetylenebis (triphenylphosphino) platinum (O), bromomethylbis (triethylphosphino) palladium (II), tetrakis (triphenylphosphino) palladium (O), chlorocarbonylbis(triphenylphosphino) iridium (I), palladium acetate, and palladium naphthenate.

The feedstocks which may be cracked using the catalysts of this invention include any conventional hydrocarbon stocks, such as naphthas, gas oil, light and heavy distillates, residual oils and the like.

There are several other ways to introduce the abovedescribed decomposable metal compounds into the unit other than with the oil feed. Referring now to FIG. 1, by way of illustration for an FCC unit, the decomposable metal compound may be introduced suspended in the air feed 46 to the regenerator; or with the steam introduced to the stripping section of the reactor via 26; or directly into spent catalyst transfer conduit 36; or into regenerated catalyst standpipe 6; or into dense fluid bed 22; or into the upper portion of riser conversion zone 4; or into cyclone separating means 32; or dipleg 34; or into catalyst bed 44; or into suspended catalyst particles 48; or into separating means such as diplegs 60, 62, 64 and 66 contained within housing 42. Direct injection into the dense bed of the regenerator 44 is a preferred means of introduction.

Whereas optional methods for introducing a decomposable metal compound have been illustrated for an FCC (fluid catalytic cracking) unit, moving bed systems likewise provide numerous locations for injection. Also, if the "swirl" regenerator of FIG. 1 is replaced with a riser-regenerator, more fully described hereinafter, the decomposable metal compound may be introduced into the riser itself, the dense bed of regenerated catalyst, or into the conduit for recycle of regenerated catalyst to spent catalyst, as well as into other locations of the apparatus equivalent to those described for FIG. 1.

The minute quantities of the metal compound catalysts used in this invention affect the overall catalytic cracking process to a different extent and in a different manner than prior catalysts used by the petroleum industry in attempts to burn CO in the regenerator. They also cause different results as compared with non-catalytic CO-burning. Nickel and vanadium are both known to be deposited on cracking catalyst from the hydrocarbon feed and both are known to be carbon monoxide oxidation catalysts. Yet these materials are considered by the petroleum industry to be catalyst poisons. To understand this, one must consider that the aim of catalytic cracking is increased production of gasoline and other lower boiling distillate fractions from whole crude oil.

When a catalyst component, such as nickel or vanadium, is considered to be a poison even though it has some activity for accomplishing a desirable objective, e.g. catalyzing CO oxidation, it is because its overall effect is to reduce the gasoline yield from the entire system. In the case of nickel and vanadium, and perhaps to a lesser extent other transition metals such as manganese and/or chromium, there is a significant increase in the coke produced on the cracking side of a reflexive catalytic cracking process as defined herein. This increased coke production may result in a higher residual carbon on regenerated catalyst in spite of the somewhat increased catalytic CO combustion. With higher residual carbon, the net effect of the deposition of these metals is to reduce the catalytic activity and gasoline selectivity of the cracking component. To the contrary, the miniscule amounts of the special CO oxidation catalyst components of the instant invention have a net effect of reducing the equilibrium coke levels on the cracking catalyst. These novel catalysts also have the net effect of increasing gasoline selectivity.

Consideration of thermal (non-catalytic) CO oxidation shows that initiating and sustaining non-catalytic CO oxidation requires and produces much higher temperatures than in the presence of a catalyst. It would appear that zeolite cracking catalyst may be adversely affected by exposure to high temperatures, such as those encountered in thermal (non-catalytic) CO burning. Therefore, the net effect of non-catalytic CO burning in the regenerator of a reflexive non-hydrogenative cracking system may be to decrease gasoline production.

In conventional reflexive, non-hydrogenative, endothermic catalytic cracking of hydrocarbons coupled with rapid cyclic regeneration (coke burn-off) of catalyst, the regenerator operates in one of several general modes. In FCC type of operation one regenerator scheme, exemplified by FIG. 1, utilizes a dense fluidized bed of catalyst into which cooled, coked catalyst is fed from the cracking reaction zone and from which regenerated, heated catalyst is taken for transfer to the feed inlet point of the cracking side reaction zone. It is usual for the dilute phase temperature in such regenerators to be higher, sometimes as much as 100° F. or more, than the dense bed temperature. The flue gas may be at a still higher temperature. One marked advantage of using a platinum group metal modified catalyst according to this invention, in combination with increasing the oxygen input to the regeneration zone, is that it tends to cause carbon monoxide to burn in the dense phase rather than in the dilute phase whereby reducing the temperature differential ($\Delta T$) between the two phases. The temperature of the dilute phase can be markedly reduced while the temperature of the dense phase is only moderately increased. This permits the additional heat generated by CO combustion to be invested in the catalyst being returned to the cracking zone to a greater extent.

There exist, in the market today, new designs for FCC units which operate with conventional catalysts and conversion of CO is accomplished thermally rather than catalytically. However, there are many problems in actual operation of these units. These problems may be eliminated through the use of the catalyst of this invention. With catalysts containing suitable low concentrations, usually well under 10 ppm total, of one or more metals chosen from Pt, Pd, Rh, Ru, Ir, Os and Re, several advantages become apparent in the operations of these units. The $\Delta T$ values decrease; that is, the dense bed temperature increases and there is a sharp decrease in the dilute phase, cyclone and effluent gas temperature. More process heat is thereby retained by the dense bed for use in the reactor. With the increased dense bed temperature, a lower rate of catalyst circulation is required to supply the same amount of heat to the reactor. The reduced catalyst circulation results in less attrition and lower particulate emissions with the effluent regeneration gas, and may also reduce catalyst makeup requirements to maintain a given activity. With the higher dense bed temperature, the residual carbon on the catalyst returning to the reactor is reduced. It has been established that lower residual carbon will result in a higher effective catalyst activity. The lower catalyst circulation rate and the lower residual coke will improve selectivity, particularly by lowering yield of coke based on charge and a corresponding increase on recoverable products. With the catalyst of this invention, steam injection to lower high cyclone temperatures is unnecessary. Injection of torch oil to raise the temperature of the dense bed to sustain thermal conversion of CO is also unnecessary. Aside from the cost of the steam and torch oil, both of these controls accelerate the deactivation of the catalyst and make the process more difficult to control. A further advantage to decreased catalyst circulation rate is less erosion of the internals of the system. Although preheat of the feed to the cracking unit can also effect or allow a reduction in catalyst circulation rate, the efficiency of energy transfer in the form of heat to the reactor is greater when the heat is generated directly in the bed of catalyst.

In some fluid cracking units as well as in moving bed units, insufficient coke is deposited on the catalyst during the cracking cycle to generate enough heat when the coke is burned in the regenerator. In such cases, the temperature in the regenerator is too low to effectively reduce the residual carbon to a desirable level (e.g., below 0.2% wt. C). Furthermore, new, higher selectivity cracking catalysts, which produce more high-valued liquid products at the expense of coke, cannot be used in these units, since they would be even more difficult to regenerate. With the catalyst of this invention sufficient additional heat is generated by oxidation of carbon monoxide to take advantage of any such improved selectivities.

Another type of FCC regeneration system utilizes a lower dense fluidized bed of catalyst to which cooled, coked catalyst is added from the cracking zone and an upper dispersed or dilute phase into which all of the catalyst from the dense phase is projected. Some of the hot regenerated catalyst from the upper dilute phase may be recycled to the lower dense bed in order to keep the temperature of the dense bed hot enough to at least start coke combustion. In this configuration, substantially all of the regenerated catalyst returned to the cracking zone is taken from the upper dispersed phase and substantially none comes directly from the lower dense bed. The use of a platinum group metal modified cracking catalyst, together with sufficient oxygen feed to the regenerator to support carbon monoxide combustion, results in increasing the dense bed temperature, decreasing the residual coke level on the catalyst in the dense bed and decreasing or perhaps even eliminating the need for hot catalyst recycle from the upper dilute phase to the lower dense phase.

In moving bed reflexive catalytic cracking exemplified by TCC referred to above, the coked catalyst is transferred from a cracking zone to a regeneration zone which is sometimes called a kiln. The kiln itself has an upper zone and a lower zone. Oxygen containing gas, preferably air, is fed between the zones while coked catalyst is fed to the topmost of the two zones. The air passes countercurrent to the coked catalyst in the upper zone burning off some coke creating a flue gas comprising carbon oxides, including substantial quantities of carbon monoxide. The partially decoked catalyst from the upper zone now passes cocurrent to a portion of the fed air in the lower zone where further coke deposits are burned off creating a flue gas comprising carbon oxides. When a catalyst incorporating a platinum group metal as set forth herein is used, and sufficient oxygen is introduced into the kiln, small changes are observed in carbon dioxide to carbon monoxide ratio in the flue gas from the upper, countercurrent regeneration zone. Under these same conditions, however, the flue gas from the lower, cocurrent regeneration zone is observed to retain substantially no carbon monoxide, it having been substantially all oxidized to carbon dioxide. The regenerated catalyst leaving the kiln is substantially hotter than without the instant platinum group metal modification and the total flue gas, which is a composite of the upper and lower kiln zone flue gases, may have somewhat less carbon monoxide.

According to one feature of this invention, a platinum group metal can be incorporated with the cracking catalyst during manufacture thereof. In the alternative, a decomposable compound of a platinum group metal can be brought into contact with the cracking catalyst during its use in a reflexive cracking process. For example in a TCC process a decomposable compound of a platinum group metal can be applied directly to coked cracking catalyst between the cracking reaction zone and the regeneration kiln zone. This type of operation, coupled with feeding sufficient air, will cause at least some of the carbon monoxide generated by coke burning in the upper countercurrent regeneration zone to be burned to carbon dioxide thereby at least reducing the carbon monoxide content of the flue gas from the upper regeneration zone. In this regard it should be understood that there is substantial competition, particularly in the upper regeneration zone, between the coke and the carbon monoxide, for the available oxygen. Therefore, in the upper zone, where relatively low temperatures and high coke levels prevail, it is difficult to burn CO with any high degree of efficiency.

Another aspect of this invention which tends to enable one to increase the utility of the cracking catalyst hereof modified with the addition of minute quantities of platinum group metal, particularly in moving bed type cracking, is to recycle some small amount of regenerated catalyst from the kiln exit to the kiln inlet. Recycle proportions may be up to about 10 weight percent or perhaps even more. It is appropriate to keep this recycle down to a minimum since it increases the necessary catalyst inventory. It is advantageous, however, in that it results in hotter and cleaner regenerated catalyst and in less carbon monoxide in the flue gas.

A further aspect of this invention, in conjunction with moving bed, e.g. TCC, cracking systems utilizing platinum group metal modified cracking catalyst, involves a change in the conventional flue gas venting scheme. In conventional operation, the flue gas from the lower kiln is admixed with the flue gas from the upper kiln and the mixture vented. According to this aspect of this invention, the flue gas from the upper kiln, which contains substantial quantities of carbon monoxide, is fed into the lower kiln regeneration zone along with the air feed thereto. This permits the carbon monoxide laden upper flue gas to contact partially and fully regenerated platinum group metal containing catalyst and excess air and therefore permits and encourages carbon monoxide to be burned to carbon dioxide to a greater extent than has heretofore been possible.

It is conventional in moving bed catalytic cracking systems to operate the entire cycle of cracking followed by regeneration with a continual downward flow of catalyst, and then to pneumatically or mechanically lift the regenerated catalyst from the bottom of the regenerator kiln to the top of the cracking reactor. Some refiners use air in the pneumatic lift, some use a combination of steam and flue gas. With the incorporation of minute amounts of platinum group metal with the cracking catalyst an opportunity presents itself for substantially reducing, or perhaps even eliminating, carbon monoxide from the flue gas. According to this aspect of this invention, hot regenerated catalyst is lifted, as slowly as practical, with a mixture of flue gas and air. The platinum group metal on the hot regenerated cracking catalyst will catalyze the combustion of carbon monoxide in the lift pipe. This will not only purify the vented flue gas, but it will also further heat the regenerated catalyst so as to enable it to more efficiently catalyze the hydrocarbon cracking reactions.

It is of course within the scope of the instant invention to use various combinations of two or more features as set forth herein. Also contemplated as within the scope of the present invention is to use combinations of the recited metals, Pt, Pd, Ru, Ir, Os, Rh and Re.

The following examples illustrate certain aspects of the process of this invention, and are not to be construed as limiting thereon.

EXAMPLE 1

215 cc of an aqueous $Pd(NO_3)_2$ solution containing 0.0103 g. Pd/liter were added to 222 g, bone dry basis, of a calcined RENaY containing 16.1 wt. % $Re_2O_3$ and 2.7 wt. % Na to 0.001 wt. % (10 ppm) Pd. The zeolite was calcined at 1200° F. for 1 hour. The zeolite (10 wt. %) was incorporated in a matrix (90 wt. %) consisting of 40 wt. % Georgia kaolin, 57.4 wt. % $SiO_2$, 0.6 wt. % $Al_2O_3$, and 2 wt. % $ZrO_2$ to provide 1 ppm palladium in the composite catalyst. The matrix was prepared by mixing water, kaolin, Q-Brand sodium silicate (28.9 wt. % $SiO_2$, 8.9 wt. % $Na_2O$, and 62.2 wt. % $H_2O$), aluminum sulfate, sodium zirconium sulfate, and sulfuric acid. The mixture was spray dried and the catalyst was exchanged with an aqueous 5 wt. % $(NH_4)_2SO_4$ solution, washed, and impregnated with an aqueous 7 wt. % $RECl_3 \cdot 6H_2O$ solution. The catalyst was then dried in an oven at about 250° F. and a portion of it was steamed for 4 hours at 1400° F. and 0 psig, the heating to 1400° F. being carried out in a $N_2$ atmosphere.

EXAMPLE 2

215 cc of an aqueous $H_2PtCl_6$ solution containing 0.0103 g Pt/liter were added to another 222 g portion of the calcined RENaY of Example 1 to provide 10 ppm platinum. A catalyst was then prepared by the same procedure as in Example 1.

The cracking performances of the catalysts of Examples 1 and 2 were determined. A wide-cut Mid-Continent gas oil feedstock was cracked at 925° F. at a catalyst-to-oil ratio of 3 by wt. 8.3 WHSV, catalyst residence time 2.4 minutes; the results were:

| Catalyst (Example) | Ex. 1 | Ex. 2 | Blank* |
|---|---|---|---|
| Conversion, % vol. | 74.4 | 70.7 | 72.1 |
| $C_5+$ gasoline % vol. | 65.0 | 63.0 | 64.3 |
| Total $C_4$'s, % vol. | 14.4 | 12.6 | 13.3 |
| Dry Gas, % wt. | 6.4 | 5.6 | 5.6 |
| Coke, % wt. | 2.5 | 2.3 | 2.3 |
| Carbon on Cat., % wt. | 0.71 | 0.65 | 0.65 |
| Hydrogen Factor** | 39 | 27 | 30 |

*Catalyst without added metal component.
**$100 \times [moles\ H_2/moles\ C_1 + C_2]$ The two catalysts were subjected to regeneration in two successive stages. The conditions of each stage of regeneration were as follows: Air was passed over the catalyst at a rate of 25 cc/min./gram of catalyst at 1000° F. and atmospheric pressure for 8 minutes, and the gas was collected.

The results were as follows:

|  | Ex. 1 | Ex. 2 | Blank* |
|---|---|---|---|
| First Stage | | | |
| $CO_2$, mol % | 3.5 | 5.2 | 4.0 |
| CO, mol % | 2.7 | 0 | 3.2 |
| $CO_2/CO$ | 1.3 | α | 1.3 |
| Initial Carbon, % wt. | 0.71 | 0.65 | — |
| Final Carbon, % wt. | 0.42 | 0.43 | — |
| Second Stage | | | |
| $CO_2$, mol % | 2.0 | 2.7 | 2.4 |
| CO, mol % | 1.2 | 0 | 1.7 |
| $CO_2/CO$ | 1.7 | α | 1.4 |
| Initial Carbon, % wt. | 0.42 | 0.43 | — |
| Final Carbon, % wt. | 0.28 | 0.26 | — |

*Catalyst without metal component

EXAMPLE 3

An RENaY (222 g) was prepared in the same manner as in Example 1, except that it was uncalcined. Thereafter, 163 cc of an aqueous $H_2PtCl_6$ solution containing 0.0137 g Pt/liter were added to provide 0.001 wt. % (10 ppm) platinum. A composite catalyst containing 1 ppm platinum was then prepared by the same procedure as in Example 1.

Cracking data, using the same feedstock as in the previous examples and under the same conditions, and regeneration data under the same conditions as in the previous examples were as follows:

| Catalyst | Ex. 3 | Blank |
|---|---|---|
| Conversion, % vol. | 76.2 | 74.4 |
| Coke, % wt. | 3.0 | 2.4 |
| Carbon on Cat., % wt. | 0.84 | 0.69 |
| Hydrogen Factor | 29 | 17 |
| Regeneration | Stage 1 | Stage 1 |
| $CO_2$, mol % | 8.3 | 3.3 |
| CO, mol % | 0.6 | 3.0 |
| $CO_2/CO$ | 13 | 1.1 |
| Final C, % wt. | 0.56 | 0.56 |
| | Stage 2 | Stage 2 |
| $CO_2$, mol % | 4.7 | 1.6 |
| CO, mol % | $\leq 0.1$ | 1.4 |
| $CO_2/CO$ | $\geq 47$ | 1.1 |
| Final C, % wt. | 0.44 | — |

The increased $CO_2/CO$ mole ratio with the presence of only 1 ppm of platinum clearly illustrates the advantage of the metal component in the catalysts of this invention.

EXAMPLE 4

A rare-earth exchanged zeolite Y (15.8 wt. % $RE_2O_3$, 2.7% Na) was slurried with an aqueous solution containing $[Pt(NH_3)_6]Cl_4$. The resulting platinum-containing zeolite was filtered, dried at 250° F., and calcined at 1200° F. for one hour. The resulting zeolite was incorporated in a matrix as described in Example 1 to give a finished cracking catalyst containing 10% of the zeolite by weight to which 1 ppm platinum had been added. A blank catalyst was prepared similarly, the $[Pt(NH_3)_6]Cl_4$ being eliminated from the zolite slurry.

Both catalysts were heated to 1400° F. and steamed as in Example 1, used to crack the feedstock of Example 1 and regenerated under the conditions of Example 2. The results were as follows:

| | Ex. 4 | Blank |
|---|---|---|
| Conversion, % vol. | 76.1 | 73.9 |
| Coke, % wt. | 2.8 | 2.5 |
| Carbon on Cat., % wt. | 0.82 | 0.73 |
| Hydrogen Factor | 19 | 16 |
| Regeneration | Stage 1 | Stage 1 |
| $CO_2$, % mol | 5.9 | 3.3 |
| CO, % mol | 0.15 | 1.7 |
| $CO_2/CO$ | 39 | 1.9 |

EXAMPLE 5

A commercial cracking catalyst consisting of 15% REY and 85% matrix of 57.4% silica, 0.6% alumina, 40% clay and 2.0% zirconia, which had been spray dried, exchanged with ammonium nitrite and water-washed, was slurried with an aqueous solution of rare earth chloride and $Pt(NH_3)_4Cl_2$ sufficient to provide 3% $RE_2O_3$ and 2 ppm platinum to the finished catalyst. The catalyst was spray dried, heated in nitrogen, then steamed for 4 hours at 1400° F. A blank catalyst without platinum was prepared and treated similarly, Pt $(NH_3)_4Cl_2$ being omitted from the slurry.

Both catalysts were used to crack the same feedstock as in Example 2 and regenerated under the conditions of Example 2. The results were as follows:

| | Ex. 5 | Blank |
|---|---|---|
| Conversion, % vol. | 79.5 | 78.8 |
| Coke, % wt. | 3.3 | 3.1 |
| Carbon on Cat., % wt. | 0.945 | 0.884 |
| Hydrogen Factor | 15.8 | 12.1 |
| Regeneration | Stage 1 | Stage 1 |
| $CO_2$, mol % | 8.2 | 4.2 |
| CO, mol % | 1.2 | 3.4 |
| $CO_2/CO$ | 6.8 | 1.2 |
| | Stage 2 | |
| $CO_2$, mol % | 5.7 | |
| CO, mol % | 0.25 | |
| $CO_2/CO$ | 23 | |

EXAMPLE 6

A number of metals of the platinum group and rhenium were used to treat a catalyst containing 15% REY silica-alumina-clay-zirconia matrix (similar to that of Example 5). Solutions of the metal salts of appropriate concentration were added to the catalyst until it was wet. The finished catalyst was dried at 250° F. for 24 hours, heated in nitrogen at 1400° F. over $3\frac{1}{2}$ hours and steamed for 4 hours. The metal salts were the chlorides of iridium, osmium and rhodium, and $[Ru(NH_3)_5Cl_2]Cl_2$ rhenium di(ethylene diamine) dioxide chloride, $Pt(NH_3)_4Cl_2$ and $Pd(NO_3)_2$. A total amount of metal equal to 3 ppm was so supplied. After the cracking of a wide-cut Mid-Continent gas oil feed and regeneration studies as in Example 2, the following results were obtained.

| Regeneration | Blank | Pt | Ir | Os | Pd | Rh | Ru | Re | Pt + Re* |
|---|---|---|---|---|---|---|---|---|---|
| Stage 1 | | | | | | | | | |
| $CO_2$, % mol | 3.8 | 7.1 | 5.7 | 4.2 | 4.6 | 4.9 | 4.5 | 3.8 | 4.6 |
| CO, % mol | 3.7 | 0.15 | 0.3 | 2.8 | 1.15 | 1.2 | 2.8 | 3.5 | 3.1 |
| $CO_2/CO$ | 1.0 | 47 | 19 | 1.5 | 4.0 | 4.0 | 1.6 | 1.1 | 1.5 |
| Stage 2 | | | | | | | | | |
| $CO_2$, % mol | — | — | — | 2.0 | — | 2.7 | 3.5 | 2.7 | — |
| CO, % mol | — | — | — | 1.65 | — | 0.7 | 1.0 | 1.4 | — |
| $CO_2/CO$ | — | — | — | 1.2 | — | 3.9 | 3.5 | 1.9 | — |

*Made from $H_2PtCl_6$ and $HReO_4$ to provide 1.5 ppm of each metal.

EXAMPLE 7

In this example, equilibrium catalyst withdrawn from a commercial FCC unit was used. A wide-cut Mid-Continent gas oil stock was cracked at 929° F., 3 catalyst-oil ratio ratio, 2.4 minute catalyst residence time. The catalyst was regenerated in place in 2 stages under the conditions of Example II. Then, the same gas oil, but now containing platinum acetylacetonate dissolved therein in sufficient quantity to provide 1 ppm platinum on the catalyst, was introduced into the cracker at the same conditions, except slightly higher temperature. The catalyst was regenerated again. Then the platinum-containing feed was again cracked over the same catalyst, and again the catalyst was regenerated. The following results were obtained:

|  | Gas Oil | Gas Oil & Pt | Gas Oil & Pt |
| --- | --- | --- | --- |
| Cracking Feed |  |  |  |
| Cycle | 1 | 2 | 3 |
| Temperature, °F. | 929 | 936 | 926 |
| Conversion, % vol. | 56.5 | 57.3 | 50.4 |
| Coke, % Wt. | 2.3 | 2.4 | 2.3 |
| Carbon on Cat., % wt. | 0.67 | 0.67 | 0.67 |
| Hydrogen Factor | 25 | 29 | 31 |
| Regeneration |  | Stage 1 |  |
| $CO_2$, % mol | 3.2 | 5.1 | 5.6 |
| CO, % mol | 2.7 | 0.18 | 0.10 |
| $CO_2/CO$ | 1.2 | 28 | 56 |
| Estimated Pt on Catalyst at end of Cycle, ppm | 0 | 1 | 2 |

EXAMPLE 8

A commercial amorphous silica-alumina fluid cracking catalyst consisting of 13% $Al_2O_3$, 87% $SiO_2$ was impregnated with an aqueous solution of $Pt(NH_3)_4Cl_2$, oven-dried at 250° F., then heated and steamed at 1400° F. as in Example 1. The amount of platinum compound supplied was equivalent to 3 ppm of the metal. The catalyst without metal addition (blank), similarly treated, and the platinum-containing catalyst were used in the fluid cracking of the Mid-Continent gas oil stock, and then regenerated under the conditions of Example 2. The results were as follows:

|  | Ex. 8 | Blank |
| --- | --- | --- |
| Catalyst |  |  |
| Conversion, % vol. | 35.8 | 35.6 |
| Coke, % wt. | 1.82 | 1.54 |
| Carbon on Cat., % wt. | 0.52 | 0.44 |
| Regeneration | Stage 1 |  |
| $CO_2$, % mol | 4.8 | 2.2 |
| CO, % mol | ≦0.05 | 1.2 |
| $CO_2/CO$ | ≧96 | 1.8 |

EXAMPLE 9

Moving bed catalysts are also improved by the presence of the added metal component of this invention. (a) A blank catalyst was prepared by incorporating 7.5% of the calcined rare-earth exchanged zeolite Y of Example 4 and 40% alumina fines in a silica-alumina matrix (93.6% $SiO_2$, 6.4% $Al_2O_3$) by the bead technique described in U.S. Pat. No. 3,140,249. After base-exchange and washing, the hydrogel beads were dried in pure steam of atmospheric pressure at 270° F. for 15 minutes, then at 340° F. for 15 minutes. The dried catalyst was finished by a 14-hour steam treatment at 1290° F. with 100% steam at atmospheric pressure. This blank catalyst was used in static bed cracking of a Mid-Continent gas oil at 875° F., a liquid hourly space velocity of 3 and a catalyst/oil ratio of 2 with 10 minutes on stream. The spent catalyst was regenerated and the $CO_2/CO$ ratio determined. (b) Rare-earth exchanged zeolite Y filter cake, 1530.6 g, containing 49.0%=750 g of solids, was mulled with 160 cc of a $H_2PtCl_6$ solution containing 10.03 mg of Pt until uniform, then dried at 250° F. and calcined at 1200° F. for 3 hours. The product contained 13.4 ppm of platinum designed to provide 1 ppm of platinum to the catalyst after combination with the matrix. The preparation of the catalyst was completed as above. (c) The blank zeolite-matrix bead hydrogel was treated for 1 hour with sufficient $Pt(NH_3)_4Cl_2$ solution to supply 1 ppm of platinum based on the finished catalyst. (d) The calcined zeolite of paragraph (a) was used to prepare a catalyst similar to that described in (a) except that the matrix contained about 2200 ppm of cogelled $Cr_2O_3$.

These catalysts were also used in cracking the said feedstock at the same conditions, and were regenerated at the conditions of Example 2. The following results were obtained:

| Catalyst | (a) | (b) | (c) | (d) |
| --- | --- | --- | --- | --- |
| Conversion, % vol. | 68.8 | 69.3 | 70.4 | 70.9 |
| Coke, % wt. | 2.9 | 3.2 | 3.1 | 3.2 |
| Regeneration |  |  |  |  |
| $CO_2$, % mol | 5.5 | 7.3 | 8.3 | 5.4 |
| CO, % mol | 4.8 | 0.4 | 0.2 | 5.0 |
| $CO_2/CO$ | 1.1 | 18 | 42 | 1.1 |

EXAMPLE 10

A commercial clay-derived alumino-silicate zeolite cracking catalyst, containing about 55% by weight of alumina and about 45% by weight of silica and having an average particle size of between 58 and 64 microns, was employed in this example. A 1000 gram sample was mixed with 3500 cc of a solution containing 58.4 grams of $RECl_3.6H_2O$ and 2.7 mg of Pt as platinum tris (ethylene diamine) tetrachloride. After stirring for 30 minutes at 75° C. the catalyst was filtered out, water-washed and dried at 250° F. The catalyst contained 3 ppm platinum and 3% by weight of rare earth oxide. Another sample of the same clay-derived catalyst ("Blank") was treated similarly, but without the platinum although with a slightly higher rare earth concentration present in the solution. The final catalyst contained 4.2% by weight of rare earth oxide. Both catalysts were steamed and tested for cracking performance as in Example 2.

A portion of each coked catalyst from the test was blended with uncoked steamed catalyst so that the carbon level of the mixture was 0.65% by weight. Regeneration was conducted at 1340° F. and atmospheric pressuring using 1.38 moles of oxygen per mole of carbon and the gas was collected. The following data were obtained:

| Regeneration | Ex. 10 | Blank |
| --- | --- | --- |
| $CO_2$, % mol | 9.1 | 7.6 |
| CO, % mol | 0.3 | 3.6 |
| $CO_2/CO$ | 30 | 2.1 |

EXAMPLE 11

The catalyst of Example 4, containing 1 ppm of platinum was calcined at 1200° F. in $N_2$ for 3 hours. A widecut Mid-Continent gas oil feedstock was cracked over this catalyst at 910° F. at a catalyst to oil ratio of 2.0 by weight, 12.5 WHSV and catalyst residence time of 2.4 minutes.

The coked catalyst from this run was blended in various concentrations with an equilibrium commercial zeolite catalyst withdrawn from a commercial FCC unit. This catalyst which contained no platinum had been regenerated and then used to crack the same gas oil feedstock as in Example 1 under the same conditions.

The variously blended coked catalysts were regenerated under the same conditions as in Example 2. The results were as follows:

| Pt-Containing Catalyst in Blend, % by wt. | Estimated Pt in Blend, ppm | $CO_2$ % mol | CO % mol | $CO_2/CO$ |
|---|---|---|---|---|
| 0 | 0 | 5.7 | 5.0 | 1.1 |
| 1 | 0.01 | 4.6 | 2.4 | 1.8 |
| 2 | 0.02 | 4.8 | 2.4 | 1.9 |
| 4 | 0.04 | 4.4 | 2.3 | 1.9 |
| 20 | 0.20 | 6.7 | 0.6 | 11 |
| 50 | 0.50 | 6.1 | 0.68 | 9.0 |
| 100 | 1.0 | 8.1 | 1.3 | 6.2 |

This experiment indicates that even at concentrations as low as 0.01 ppm of added metal component, the $CO_2/CO$ ratio is increased during regeneration.

The catalyst with added metal component may even contain an amount of metal component greater than that of the ultimate cracking catalyst mixture, such as, for example, but not necessarily, 100 ppm, provided that either in the use of the catalyst for cracking or in the regeneration of used catalyst it is blended with cracking catalyst containing less or no metal component at sufficient concentrations to reduce the total added metal component to a concentration below 100 ppm.

It may thus be seen from the results of the cracking operations and subsequent regeneration data that the catalysts of this invention are just as effective in hydrocarbon conversion as conventional cracking catalysts. However, in the regeneration step, the $CO_2/CO$ effluent ratios are extraordinarily higher than catalysts without the added metal component. The type of catalyst, feedstock or manner of introducing the new component does not destroy the effectiveness in regeneration efficiency.

EXAMPLE 12

This example demonstrates that Pt is an effective CO oxidative agent when it is incorporated in a hydrous composite of all the gel components prior to spray drying.

A cracking catalyst incorporating 5 ppm of Pt with 15% rare earth zeolite Y in a silica-alumina clay matrix (60% $SiO_2$-15% $Al_2O_3$-25% clay) was prepared as follows: 581.4 grams of WP grade Georgia kaolin were added to 45.2 lb (5.4 gallons) of deionized water and the whole was mixed thoroughly. 4167 grams Q-brand sodium silicate (1200 gms $SiO_2$) were added slowly to the water-clay slurry, such that the clay was uniformly dispersed and coated with the sodium silicate. The mixture was heated to 120° F. and 216.1 ml concentrated (96.9%) sulfuric acid was added at a uniform rate over a period of 25 min. while mixing. The whole mixture was then held at 120° F. for one hour while mixing, then allowed to cool to ambient temperature. A solution of 1744.2 grams aluminum sulfate (500 gms $Al_2O_3$) dissolved in 6977 ml deionized water was added slowly to the mixture while stirring. The resulting mixture, which had a pH of 3.3, was treated with 1150 ml of conc. ammonium hydroxide (29.8% $NH_3$) while stirring, in order to precipitate the alumina on the silica gel. The mixture was then acidified with 93 ml concentrated sulfuric acid (95.9%) to a pH of 4.6.

294.2 gms of REY (68% of the sodium content had been replaced with rare earth cations), which had previously been calcined at about 1200° F. for about 10 min., were dispersed in 883 ml deionized water in a Waring blender (the REY had the following composition: $SiO_2 = 57.9\%$; $Al_2O_3 = 19.0\%$; $RE_2O_3 = 15.4\%$; $Na_2O = 3.6\%$). The zeolite slurry was added to the silica-alumina-clay mixture while mixing. The zeolite-matrix slurry was filtered on a Buchner funnel and the filter cake reslurried with deionized water to a total weight of 55 lbs, 230 gms ammonium sulfate added, and the whole mixture stirred for 30 minutes. The composite hydrogel was then washed by filtering, reslurrying the filter cake with dionized water to a total weight of 80 lbs and refiltering. This washing procedure was performed three times. After the final filtration, the filter cake was reslurried to a total weight of 51 lbs with deionized water; the pH of the final slurry was 4.5.

To the final slurry of the catalyst composite 5.7 mil of a solution containing 2 mg Pt/ml at Pt $(NH_3)_4Cl_2$ was added (a total of 11.4 mg Pt). The mixture was homogenized and spray dried (inlet gas to spray drier about 700° F. and outlet gas about 350° F.) to produce microspheres of from about 1 to 140 microns in diameter, with an average partical size of 79 microns. A sample of the product analyzed as follows: $Na = 0.39\%$, $RE_2O_3 = 1.82\%$, $Al_2O_3 = 25.0\%$.

The catalyst was steam treated and tested for cracking activity and selectivity as previously described. The oxidation activity was determined by passing air (215°/min) through a fluidized bed of 10 gms of a blend of coked and uncoked steamed catalyst containing a total of 0.65% carbon at 1340° F. Analyses of the effluent gas for CO and $CO_2$ gave a $CO_2/CO$ ratio of 2.9, substantially higher than would be anticipated for the same catalyst without platinum.

EXAMPLES 13–18

Platinum was incorporated in fresh samples of commercial catalysts produced by the Filtrol Corporation. Filtrol 75-F, HS-7 and HS-10 were impregnated with aqueous solutions containing sufficient $[Pt(NH_3)_4]Cl_2$ to give 5 ppm Pt in the finished catalyst. The amount of solution used was just sufficient to fill the pores of the catalyst, so that Pt retention was quantitative. In an additional preparation, the impregnating solution contained both $[Pt(NH_3)_4]Cl_2$ and rare earth chloride hexahydrate sufficient to produce 5 ppm Pt and 3.0% $RE_2O_3$ in the finished catalyst. All the preparations were dried in air at 250° F., then mildly steam treated for 4 hours - 1400° F. - 0 psig in 100% steam in a fluidized bed.

Cracking activity and selectivity were tested by cracking a wide-cut Mid-Continent gas oil over the steamed catalysts at 920° F., 3 C/O, 8.3 WHSV in a fixed fluidized bed. The results of these tests showed that the presence of Pt produced no significant effect on activity or selectivity; in particular, Pt had a negligible effect on hydrogen factor (see attached tables).

Oxidation activity was tested by blending the coked catalysts from the cracking test to 0.65% carbon with uncoked steamed catalysts, then passing a stream of air (215 cc/min) through a fluidized bed of 2 gms of the blended coked catalyst at 1190° F. The effluent gas was analyzed for CO and $CO_2$, activity being measured by the $CO_2/CO$ ratio. The results (attached tables) show very high oxidataion activities for the Pt-Containing catalysts.

| Effect of Platinum on Filtrol 75-F | | | |
|---|---|---|---|
| | Example | | |
| | 13 | 14 | 15 |
| | Base | Base + 5 ppm Pt | Base + 5 ppm Pt and 3% wt RE$_2$O$_3$ |
| Treatment: Hours | 4.0 | 4.0 | 4.0 |
| : Temp., °F. | 1400 | 1400 | 1400 |
| : % Steam | 100 | 100 | 100 |
| Conversion, % Vol | 80.3 | 76.21 | 79.9 |
| C$_5$+ Gasoline, % Vol | 66.7 | 63.5 | 66.1 |
| Total C$_4$, % Vol | 15.8 | 14.5 | 15.5 |
| Dry Gas, % Wt. | 7.0 | 6.3 | 6.9 |
| Coke, % Wt. | 3.57 | 3.88 | 3.91 |
| Hydrogen Factor | 30 | 39 | 36 |
| Recovery, % Wt | 96.5 | 97.0 | 96.7 |
| Oxidation Activity (1119° F., 2 gm Sample) | | | |
| CO$_2$/CO | 0.9 | 83 | 150 |
| Relative CO$_2$/CO | 1.0 | 92 | 167 |

| Effect of Platinum on Filtrol HS-7 and HS-10 | | | |
|---|---|---|---|
| | Example | | |
| | 16 | 17 | 18 |
| | HS-7 | HS-7 + 5 ppm Pt | HS-10 + 5 ppm Pt |
| Treatment: Hours | 4.0 | 4.0 | 4.0 |
| Gasoline, : Temp., °F. | 1400 | 1400 | 1400 |
| : % Steam | 100 | 100 | 100 |
| Conversion, % Vol | 81.6 | 84.4 | 80.3 |
| C$_5$+ Gasoline,m % Vol | 66.4 | 66.2 | 65.4 |
| Total C$_4$, % Vol | 18.9 | 18.5 | 17.1 |
| Dry Gas, % Wt | 7.8 | 8.1 | 7.4 |
| Coke, % Wt | 4.44 | 5.55 | 4.17 |
| Hydrogen Factor | 35 | 37 | 45 |
| Recovery, % Wt | 95.9 | 97.2 | 96.3 |
| Oxidation Activity (1190° F., 2 gm Sample) | | | |
| CO$_2$/CO | 1.7 | 12 | 119 |
| Relative CO$_2$/CO | 1.0 | 7 | 70 |

EXAMPLES 19-31

Following is the preparation of a fluid cracking catalyst which served as the base and for the preparation of the other examples of this series:

15% rare earth zeolite Y (REY) in silica-zirconia-alumina-clay matrix 57.4% SiO$_2$, 2% ZrO$_2$, 0.6 Al$_2$O$_3$, 40% clay.

1860.4 grams of WP grade Georgia kaolin were added to 86.4 pounds (10.3 gallons) of deionized water and the whole was mixed thoroughly. 7972.9 grams of Q-brand, sodium silicate (containing 2310 grams SiO$_2$) were added to the water-clay slurry. The sodium silicate was added slowly over a period of thirty minutes while mixing. The clay was uniformly dispersed and coated with sodium silicate. The whole was heated to 120° F. and then 408.8 milliliters of aqueous sulfuric acid (97% wt H$_2$SO$_4$) were added at a uniform rate over a period of one hour while mixing. The whole was then held at 120° F. for one hour. 139.5 grams of aluminum sulfate in 560 milliliters of deionized water were added at uniform rate over a ½ hour period while mixing. To 178 grams of TAM sodium zirconium slicate (Na$_2$ZrSiO$_5$: 24-26% Na$_2$O, 46-49% Zr; 22-24% SiO$_2$) in 1730 milliliters deionized water were added 115 milliliters of sulfuric acid (97% wt H$_2$SO$_4$). This resulting slurry was then added to the clay-silicate gel at uniform rate over a ½ hour period while mixing. While agitating, additional sulfuric acid (97% wt H$_2$SO$_4$) was added over the next ½ hour to lower the pH to 4.5. 726.7 grams of REY (68% exchanged; i.e., 68% of the sodium content had been replaced with rare earth cations), which previously had been calcined at about 1200° F. for about 10 minutes, were slurried by dispersion in a Waring blender in 2180 milliliters of deionized water. (The REY had the following composition: Al$_2$O$_3$=19.0%; SiO$_2$=57.9%; (RE)$_2$O$_3$=15.4%; Na$_2$O=3.6%.) This slurry was added to the foregoing silica-zirconia-alumina-clay slurry while mixing. The blend was homogenized and then spray dried (inlet gas to spray drier about 700° F. and outlet gases about 350° F.) to produce microspheres of from about 1 to 140 microns in diameter, with an average particle size of about 62 microns.

The spray dried particles were then slurried with deionized water, decanted, and exchanged in a column with 40 gallons of a 5% aqueous ammonium sulfate solution to remove sodium. Thereafter the particles were washed with the water until the effluent was free of sulfate ions. The product was then dried in an oven at 250° F.

A sample of the product analyzed as follows:

| | Wt percent |
|---|---|
| Na | 0.05 |
| (RE)$_2$O$_3$ | 1.95 |
| NH$_3$ | 0.64 |

Platinum-group metals were incorporated by impregnating the dried solid base catalyst with aqueous solutions containing the appropriate quantities of metal salts. The volume of impregnating solution was sufficient to just fill the pores of the catalyst, so that metal retention was quantitative. The particular salts were [Pt(NH$_3$)$_4$]Cl$_2$, [Pd(NH$_3$)$_4$]Cl$_2$, [Ir(NH$_3$)$_5$Cl]Cl$_2$, [Rh(NH$_3$)$_5$Cl]Cl$_2$, [Os(NH$_3$)$_6$]I$_3$, and [Ru(NH$_3$)$_5$Cl]Cl$_2$.

Each catalyst was steamed in a fluidized bed for 4 hours at 1400° F. at 0 psig with 100% steam, after being heated to 1400° F. in a stream of nitrogen. The cracking activity and selectivity was tested by using the steamed catalysts to crack a wide-cut Mid-Continent gas oil (29.2° API) in a fixed fluidized bed at 902° F., 3 C/O, 8.3 WHSV. The oxidation activities were determined by blending the coked catalyst from the cracking test with fresh steamed catalyst to 0.65% wt carbon, passing a stream of air at 215 cc/min through a fluidized bed of 4 gms of the blend at 1240° F. until all the carbon had been removed. The effluent gas was analyzed for CO and CO$_2$, the oxidation activity being represented as the CO$_2$/CO ratio (mole/mole).

The catalysts prepared, along with the data derived from the cracking and oxidation tests, are given in the following tables.

The cracking activity and selectivity data show that addition of up to 10 ppm of any platinum group metal results in little or no decline in selectivity. Even at 50 ppm Pt, the hydrogen factor (100×moles H$_2$/moles C$_1$+C$_2$), a sensitive measure of metal poisoning, has increased from 13 to only 40; many commercially acceptable cracking catalysts give similar hydrogen factors without an oxidation promoter.

Each catalyst shows a significant oxidation activity, although the different metals have different activities. The activities are compared in FIG. 3 (log-log plot). The approximate relative activities are:

Ir≧Pt>Pd=Rh≧Ru>OS

| Example | 19 | 20 | 21 | 22 | 23 |
|---|---|---|---|---|---|
| Promoter | Base | Pt | Pt | Pt | Pt |
| Promoter Content, ppm | .0 | .5 | 5.0 | 10.0 | 50.0 |
| Cracking Test[1] | | | | | |
| Conversion, % Vol | 79.8 | 78.3 | 76.6 | 75.5 | 76.9 |
| $C_5+$ Gasoline, % Vol | 68.8 | 64.8 | 64.9 | 62.2 | 64.2 |
| Total Butanes, % Vol | 14.5 | 15.8 | 15.3 | 16.4 | 15.2 |
| Dry Gas, % Wt | 6.7 | 7.0 | 6.5 | 6.8 | 6.6 |
| Coke, % Wt | 2.8 | 3.4 | 2.7 | 3.1 | 3.3 |
| Hydrogen Factor[2] | 13 | 17 | 22 | 26 | 40 |
| Oxidation Activity[3] | | | | | |
| $CO_2/CO$ at 1240° F. | 0.77 | 1.8 | 43 | 49 | 1000 |
| Relative $CO_2/CO$ Activity | 1.0 | 2.4 | 56 | 64 | 1304 |

[1] Fixed fluidized bed, WCMCGO, 8.3 WHSV, 3 C/O, 920° F.
[2] Moles $H_2$/Moles $C_1 + C_2 \times 100$
[3] 1240° F., 215 cc air/min, 4 g catalyst-coked catalyst from cracking test was blended with fresh steamed catalyst to give 0.65% wt C on total sample

| Example | 24 | 25 | 26 | 27 | 28 |
|---|---|---|---|---|---|
| Promoter | Pd | Pd | Ir | Ir | Rh |
| Promoter Content, ppm | 2.0 | 10.0 | 2.0 | 5.0 | 5.0 |
| Cracking Test[1] | | | | | |
| Conversion, % Vol | 79.2 | 77.7 | 78.0 | 76.2 | 76.7 |
| $C_5 +$ Gasoline, % Vol | 66.0 | 65.8 | 65.6 | 63.1 | 64.5 |
| Total Butanes, % Vol | 15.9 | 15.1 | 14.5 | 15.9 | 15.3 |
| Dry Gas, % Wt | 7.1 | 6.4 | 6.4 | 6.5 | 6.6 |
| Coke, % Wt | 3.0 | 2.7 | 3.3 | 3.3 | 2.8 |
| Hydrogen Factor[2] | 17 | 18 | 15 | 19 | 13 |
| Oxidation Activity[3] | | | | | |
| $CO_2/CO$ at 1240° F. | 1.5 | 36 | 12 | 43 | 11 |
| Relative $CO_2/CO$ Activity | 1.9 | 47 | 16 | 57 | 15 |

[1] Fixed fluidized bed, WCMCGO, 8.3 WHSV, 3 C/O, 920° F.
[2] Moles $H_2$/Moles $C_1 + C_2 \times 100$
[3] 1240° F., 215 cc air/min, 4 g catalyst-coked catalyst from cracking test was blended with fresh steamed catalyst to give 0.65% wt C on total sample

| Example | 29 | 30 | 31 |
|---|---|---|---|
| Promoter | Rh | Os | Ru |
| Promoter Content, ppm | 10.0 | 5.0 | 5.0 |
| Cracking Test[1] | | | |
| Conversion, % Vol | 79.3 | 74.7 | 79.2 |
| $C_5 +$ Gasoline, % Vol | 65.5 | 61.3 | 67.2 |
| Total Butanes, % Vol | 15.8 | 15.1 | 15.7 |
| Dry Gas, % Wt | 6.9 | 7.3 | 6.1 |
| Coke, % Wt | 3.4 | 2.7 | 2.8 |
| Hydrogen Factor[2] | 13 | 15 | 13 |
| Oxidation Activity[3] | | | |
| $CO_2/CO$ at 1240° F. | 26 | 2.2 | 8.6 |
| Relative $CO_2CO$ Activity | 34 | 2.8 | 11 |

[1] Fixed fluidized bed, WCMCGO, 8.3 WHSV, 3 C/O, 920° F.
[2] Moles $H_2$/Moles $C_1 + C_2 \times 100$
[3] 1240° F., 215 cc air/min, 4 g catalyst-coked catalyst from cracking test was blended with fresh steamed catalyst to give 0.65% wt C on total sample

EXAMPLES 32–45

Platinum-Group and Transition Metals Incorporated on Fresh DHZ-15

A commercial cracking catalyst, DHZ-15, manufactured by the Davison Chemicl Division of W. R. Grace & Co., was impregnated with aqueous solutions of $Pt(HN_3)_4Cl_2$, $Cr(NO_3)_3.6H_2O$, $MnCl_2.4H_2O$ and $Ni(NO_3).4H_2O$ to the levels listed in the following table. The impregnating solution volume was sufficient to just fill the pore of the catalyst, so that metal retention was quantitative. The catalysts were steam treated, tested for cracking activity and selectivity, and oxidation activity as described in Examples 19-31.

Incorporation of Pt to 1, 5 and 10 ppm shows very high oxidation activity; cracking activity and selectivity show no degradation.

At a Cr level of 10,000 ppm (1% wt Cr), a severe loss in activity and some loss in selectivity have occured, while only a minor increase in oxidation activity is observed, particularly in comparison to Pt (even at 1 ppm). A similar result is obtained with Mn, where substantially no oxidation activity is evident even at 10,000 ppm. Incorporation of Mn has, however, resulted in major losses in cracking activity.

Incorporation of nickel results in substantially no increase in oxidation activity, but results in serious losses in cracking selectivity, particularly with respect to increased coke yields and hydrogen factor.

TABLE

| Example | 32 | 33 | 34 | 35 | 36 |
|---|---|---|---|---|---|
| Promoter | Base | Pt | Pt | Pt | Pt |
| Promoter Content, ppm | .0 | .2 | .4 | .6 | 1.0 |
| Cracking Test | | | | | |
| Conversion, % Vol | 71.8 | 74.2 | 73.9 | 75.2 | 75.8 |
| $C_5 +$ Gasoline, % Vol | 58.7 | 56.6 | 56.8 | 57.0 | 61.9 |
| Total Butanes, % Vol | 15.2 | 16.8 | 16.4 | 17.8 | 16.5 |
| Dry Gas, % Wt | 6.4 | 8.0 | 7.8 | 8.1 | 6.9 |
| Coke, % Wt | 3.2 | 4.4 | 4.3 | 4.6 | 3.3 |
| Hydrogen Factor | 26 | 22 | 22 | 23 | 27 |
| Oxidation Activity | | | | | |
| $CO_2CO$ at 1240° F. | 1.7 | 2.1 | 2.8 | 3.4 | 11 |
| Relative $CO_2CO$ Activity | 1.0 | 1.3 | 1.67 | 2.1 | 6.7 |

TABLE

| Example | 37 | 38 | 39 | 40 | 41 |
|---|---|---|---|---|---|
| Promoter | Pt | Pt | Cr | Cr | Cr |
| Promoter Content, ppm | 5.0 | 10.0 | 500 | 2,000 | 10,000 |
| Cracking Test | | | | | |
| Conversion, % Vol | 71.0 | 77.0 | 74.8 | 77.6 | 60.8 |
| $C_5+$ Gasoline, % Vol | 60.6 | 62.2 | 61.2 | 62.1 | 49.9 |
| Total Butanes, % Vol | 13.2 | 17.0 | 15.6 | 16.6 | 12.0 |
| Dry Gas, % Wt | 6.2 | 7.2 | 6.8 | 7.3 | 5.3 |
| Coke, % Wt | 3.0 | 3.4 | 3.3 | 3.6 | 3.0 |
| Hydrogen Factor | 23 | 30 | 23 | 21 | 23 |
| Oxidation Activity | | | | | |
| $CO_2/Co$ at 1240° F. | 80 | 172 | 1.8 | 1.5 | 3.8 |
| Relative $CO_2/CO$ Activity | 48 | 103 | 1.1 | 0.9 | 2.3 |

TABLE

| Example | 42 | 43 | 44 | 45 |
|---|---|---|---|---|
| Promoter | Ni | Ni | Mn | Mn |
| Promoter Content, ppm | 100 | 1,000 | 5,000 | 10,000 |
| Cracking Test | | | | |
| Conversion, % Vol | 73.9 | 76.5 | 67.4 | 56.4 |
| $C_5 +$ Gasoline, % Vol | 58.8 | 58.2 | 55.6 | 48.4 |
| Total Butanes, % Vol | 15.5 | 16.5 | 13.4 | 10.5 |
| Dry Gas, % Wt | 6.7 | 7.8 | 6.0 | 4.9 |
| Coke, % Wt | 3.8 | 5.7 | 2.9 | 2.2 |
| Hydrogen Factor | 45 | 142 | 23 | 23 |
| Oxidation Activity | | | | |
| $CO_2CO$ at 1240° F. | 2.0 | 1.9 | 0.9 | 1.8 |
| Relative $CO_2CO$ Activity | 1.2 | 1.1 | 0.5 | 1.1 |

EXAMPLES 46 AND 47

As has been stated, the oxidation promoters of this invention are very effective for substantially complete conversion of CO to $CO_2$ in FCC regenerators. But, they can also be used to advantage in applications where only partial conversion of CO is desired, as for example, in units which are temperature limited by their materials of construction. The substantial value of operating in a partial CO conversion mode is illustrated by these examples, which demonstrate the product yield benefits obtained in an active commercial test.

Figure 3:
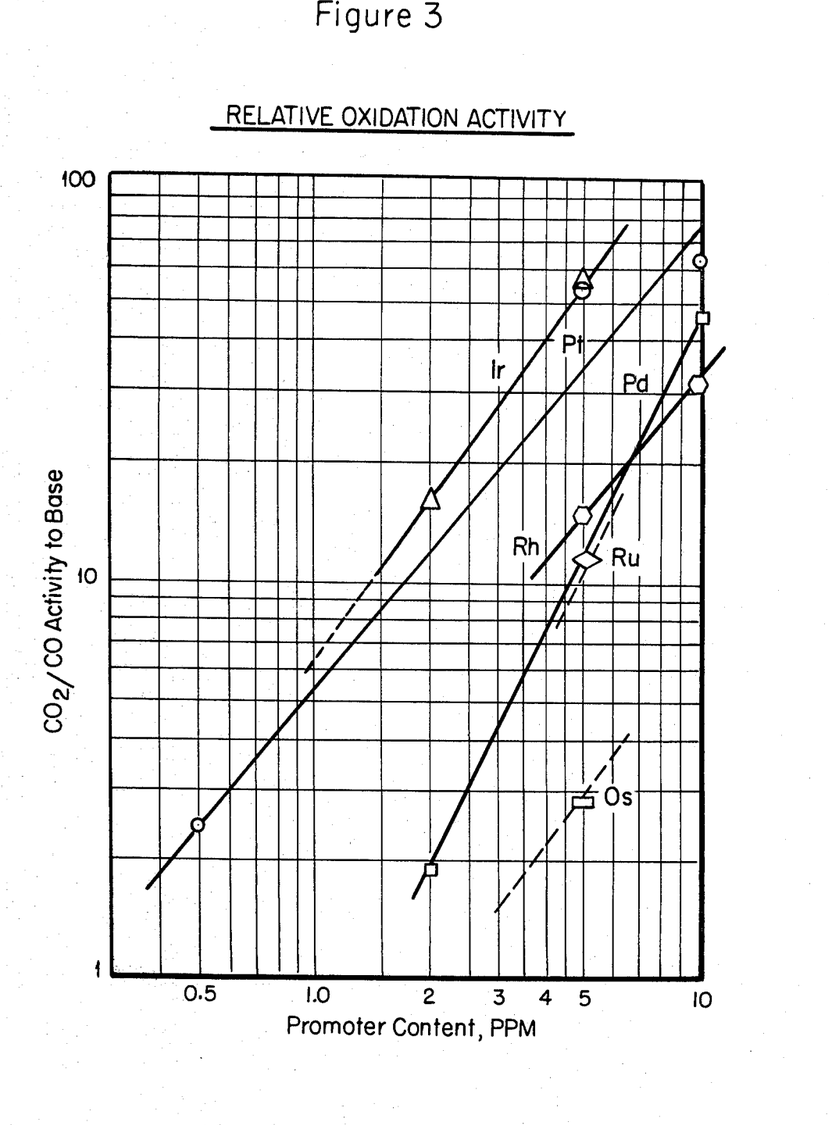

The test (Example 46) was made in an FCC unit of the Swirl regenerator type, corresponding to FIGS. 1, 2 and 3 of the Drawings, which had been operating with Pt promoted DHZ-15 catalyst manufactured by the Davison Division of W. R. Grace & Company. The test run (Example 46) was made, after adding as makeup 66.8 tons of DHZ-15 promoted with 0.14 ppm Pt for over a period of 8 days, followed by 39.6 tons of DHZ-15 promoted with 0.4 ppm Pt over the next 6 days, followed by 37.7 tons of DHZ-15 promoted with 0.6 ppm over the next 7 days, and 21.6 tons of DHZ-15 promoted with 0.8 ppm over the next 5 days. At this point, the amount of nickel in the total catalyst inventory was about 190 ppm and the amount of vanadium was about 240 ppm. Platinum was 0.14 ppm, by calculation.

A second test run (Example 47) was made in the same FCC unit after further addition of 42.2 tons of DHZ-15 promoted with 0.8 ppm Pt over a period of 7 days, followed by 21.3 tons of DHZ-15 promoted with 2 ppm Pt over the next 3 days. The platinum content was 0.31 ppm, by calculation.

Example 46 involves a low level of catalytic conversion of CO. Example 47 test, which was made when the unit contained catalyst with a higher level of oxidation activity as indicated by the $CO_2/CO$ ratio in the flue gas, showed a substantial increase in conversion, a reduction in coke yield, an increase in gasoline yield and a reduction in carbon on regenerated catalysts even though this unit was still operated with only partial catalytic conversion of CO.

The results are shown in the following table.

TABLE

| | Example 46 | Example 47 |
|---|---|---|
| Fresh Feed Rate, B/D | 42,000 | 42,300 |
| Coker in Feed, % Vol | 23.9 | 24.7 |
| Fresh Feed Gravity, °API | 22.5 | 22.8 |
| Reactor Temp., °F. | 978 | 981 |
| Avg. Regenerator Dense Bed Temp. °F. | 1168 | 1228 |
| Carbon on Regen. Catalyst, % Wt. | 0.36 | 0.17 |
| Flue Gas $CO_2/CO$ Ratio | 1.2 | 1.7 |
| Conversion, % vol F.F. | 66.2 | 69.4 |
| Product Yields | | |
| $C_2$ and Lighter, F.O.E./B. | 0.064 | 0.070 |
| $C_3$ % vol F.F. | 3.5 | 3.9 |
| $C_3=$ % vol F.F. | 6.4 | 7.1 |
| $iC_4$ % vol F.F. | 4.1 | 4.7 |
| $nC_4$ % vol F.F. | 1.5 | 1.7 |
| $C_4$ % vol F.F. | 7.5 | 7.9 |
| $C_5+$ Gasoline % vol F.F. | 45.3 | 47.3 |
| Light cycle oil % vol F.F. | 28.5 | 25.5 |
| Clarified Slurry oil % vol F.F. | 5.3 | 5.1 |
| Coke, % wt F.F. | 6.7 | 6.4 |

The incremental yield of gasoline of 2% obtained in Example 47, compared to Example 46, calculates a projected increase in production of about 15,000,000 gallons per year for this unit alone. The unit could not have been operated to obtain these benefits without the use of the catalyst of this invention.

It will also be seen that addition of platinum promoted catalyst to a system which already contained CO promoter (Ni, V) did not, as might be expected, result in loss of liquid yield until the catalyst circulation was so far reduced that catalyst to oil ratio became controlling and caused loss of gasoline production. These effects are dramatically illustrated by the graphs of FIG. 5, showing clearly defined maxima in conversion and gasoline yield as $CO_2/CO$ values are reduced.

What is claimed is:

1. A solid, acid, porous hydrocarbon cracking catalyst that contains about 0.01 to 100 parts per million, based on said catalyst, of at least one metal of the group consisting of platinum, palladium, iridium, osmium, rhodium, ruthenium and rhenium in a form inherently capable of dehydrogenting gas oil; which catalyst has substantial activity to catalyze the endothermic cracking, in a cracking zone of a catalytic cracking apparatus, of gas oil boiling range hydrocarbons at elevated tempertures and in the absence of added hydrogen, with concomitant deactivation during said cracking by reasons of the deposition of coke thereon, in an amount not substantially higher than the amount of coke, based upon feed, which would have been deposited on said catalyst under the same operating conditions in the absence of said incorporated metal; which catalyst in its coked condition is adapted to be transported to a regeneration zone of said apparatus and therein, in combination with sufficient oxygen, to be exothermically regenerated and heated by burning coke thereof to produce a heated, reactivated catalyst and a flue gas having a higher ratio of carbon dioxide to carbon monoxide than said flue gas would have using said catalyst without said metal; which heated, reactivated catalyst is adapted to be returned to said cracking zone; and which catalyst acquired a portion of said metal content while in said cracking apparatus.

2. The cracking catalyst article claimed in claim 1 containing up to about 50 ppm of said metal.

3. The cracking catalyst claimed in claim 1 having a particle size such that it is suitable for use in fluid cracking.

4. The cracking catalyst claimed in claim 1 having a particle size such that it is suitable for use in Thermoform Catalyst Cracking (TCC).

5. The cracking catalyst claimed in claim 3 having an average particle size of about 10 to 100 microns.

6. The cracking catalyst claimed in claim 1 or 2 or 3 or 4 or 5 containing up to 10 ppm of said metal.

* * * * *

UNITED STATES PATENT AND TRADEMARK OFFICE
CERTIFICATE OF CORRECTION

PATENT NO. : 4,350,614

DATED : September 21, 1982

INVENTOR(S) : Albert B. Schwartz

It is certified that error appears in the above—identified patent and that said Letters Patent is hereby corrected as shown below:

In the Abstract [57] change "Non-hyrogenative" to --Non-hydrogenative--
Col. 2, line 51, change "1/2" to --1/8--
Col. 9, line 7, change "then" to --than--
Col. 15, line 39, change "zolite" to --zeolite--
Col. 21, line 11 of the Table, change "76.21" to --76.1--
Col. 21, line 18 of the Table, change "1119°F" to --1190°F--
Col. 21, line 25, change "Gasoline," to --Temp., °F--
Col. 21, line 26, delete "Temp., °F--
Col. 21, line 28, change "Gasoline,m" to --Gasoline,--
Col. 22, line 65, change "Ir≧Pt>Pd=Rh≧Ru>OS" to --Ir≧Pt>Pd=Rh>Ru>OS--
Col. 23, line 60, change "Chemicl" to --Chemical--

Signed and Sealed this

Eleventh Day of October 1983

[SEAL]

Attest:

GERALD J. MOSSINGHOFF

Attesting Officer    Commissioner of Patents and Trademarks